United States Patent
Sienkiewicz et al.

(10) Patent No.: US 11,303,043 B2
(45) Date of Patent: Apr. 12, 2022

(54) ANTENNA ARRANGEMENT FOR MULTIPLE FREQUENCY BAND OPERATION

(71) Applicant: Telefonaktiebolaget L M Ericsson (publ), Stockholm (BE)

(72) Inventors: Esther Sienkiewicz, Ottawa (CA); Bo Göransson, Sollentuna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 522 days.

(21) Appl. No.: 14/764,733

(22) PCT Filed: Feb. 6, 2013

(86) PCT No.: PCT/SE2013/050096
§ 371 (c)(1),
(2) Date: Jul. 30, 2015

(87) PCT Pub. No.: WO2014/123461
PCT Pub. Date: Aug. 14, 2014

(65) Prior Publication Data
US 2015/0372396 A1    Dec. 24, 2015

(51) Int. Cl.
*H01Q 21/30* (2006.01)
*H01Q 21/08* (2006.01)
(Continued)

(52) U.S. Cl.
CPC ........... *H01Q 21/30* (2013.01); *H01Q 1/246* (2013.01); *H01Q 5/50* (2015.01); *H01Q 21/08* (2013.01);
(Continued)

(58) Field of Classification Search
CPC .......... H01Q 21/30; H01Q 1/246; H01Q 5/50; H01Q 21/08; H04B 1/0057; H04B 1/401; H04L 5/14; H04W 88/08
(Continued)

(56) References Cited

U.S. PATENT DOCUMENTS

| | | | |
|---|---|---|---|
| 5,400,042 A | 3/1995 | Tulintseff et al. | |
| 5,940,048 A | 8/1999 | Martek | |
| 6,211,841 B1 | 4/2001 | Smith et al. | |
| 7,346,323 B2* | 3/2008 | Ahonpaa ................ | H04B 7/022 455/272 |

(Continued)

FOREIGN PATENT DOCUMENTS

| | | |
|---|---|---|
| CN | 202050054 U | 11/2011 |
| EP | 2487800 A1 | 8/2012 |

(Continued)

OTHER PUBLICATIONS

Unknown, Author, "Linear Arrays of n Elements of Equal Amplitude and Spacing", Available online at http://www.gmrt.ncra.tifr.res.in/gmrt_hpage/Users/doc/WEBLF/LFRA/node44.html, Apr. 12, 2010, 1-3.

(Continued)

*Primary Examiner* — Ankur Jain
(74) *Attorney, Agent, or Firm* — Murphy, Bilak & Homiller, PLLC

(57) ABSTRACT

The present disclosure relates to an antenna arrangement (12) connectable to a transceiver (10) for simultaneously transmitting and receiving Radio Frequency, RF, signals. The antenna arrangement (12) comprises two or more sets of antenna elements (14, 16, 22). The sets of antenna elements have different antenna element spacing and comprise interface units (18, 20, 24) which are connected to a transceiver (10). The interface units (18, 20, 24) are configured for transmitting RF signals with a first frequency and for receiving RF signals with another frequency.

12 Claims, 2 Drawing Sheets

(51) Int. Cl.
*H01Q 1/24* (2006.01)
*H01Q 5/50* (2015.01)
*H04B 1/00* (2006.01)
*H04B 1/401* (2015.01)
*H04L 5/14* (2006.01)
*H04W 88/08* (2009.01)

(52) U.S. Cl.
CPC .......... *H04B 1/0057* (2013.01); *H04B 1/401* (2013.01); *H04L 5/14* (2013.01); *H04W 88/08* (2013.01)

(58) Field of Classification Search
USPC .......................................................... 455/77
See application file for complete search history.

(56) References Cited

U.S. PATENT DOCUMENTS

| | | | |
|---|---|---|---|
| 2007/0205955 A1 | 9/2007 | Korisch et al. | |
| 2009/0009392 A1* | 1/2009 | Jacomb-Hood | H01Q 1/288 342/374 |
| 2009/0128253 A1* | 5/2009 | Goi | H04B 1/006 333/101 |
| 2009/0135078 A1* | 5/2009 | Lindmark | H01Q 1/523 343/844 |
| 2009/0322608 A1* | 12/2009 | Adams | H01Q 1/246 342/368 |
| 2010/0053024 A1 | 3/2010 | Andersson et al. | |
| 2010/0157858 A1* | 6/2010 | Lee | H01Q 9/40 370/297 |
| 2011/0014958 A1* | 1/2011 | Black | H01Q 1/243 455/575.7 |
| 2011/0065472 A1* | 3/2011 | Zhu | H03F 1/56 455/552.1 |
| 2011/0102289 A1* | 5/2011 | Leem | H01Q 9/0414 343/846 |
| 2012/0113873 A1* | 5/2012 | Sanchez | H04B 1/006 370/277 |
| 2013/0050056 A1* | 2/2013 | Lee | H01Q 1/2291 343/893 |
| 2013/0154886 A1* | 6/2013 | Isohatala | H01Q 1/243 343/702 |
| 2013/0244586 A1* | 9/2013 | Nabar | H04L 25/0206 455/69 |
| 2013/0265912 A1* | 10/2013 | Ikonen | H01Q 1/2291 370/278 |
| 2014/0024322 A1* | 1/2014 | Khlat | H04B 7/0404 455/78 |
| 2014/0078000 A1* | 3/2014 | Huang | H01Q 5/40 343/700 MS |
| 2014/0120991 A1* | 5/2014 | Wong | H01Q 5/35 455/575.1 |
| 2014/0187174 A1* | 7/2014 | Safavi | H04B 7/0413 455/73 |
| 2014/0333486 A1* | 11/2014 | Greetis | H01Q 1/52 343/702 |
| 2015/0180514 A1* | 6/2015 | Pavacic | H04B 1/0064 455/552.1 |

FOREIGN PATENT DOCUMENTS

| | | |
|---|---|---|
| JP | 06224628 A | 8/1994 |
| KR | 1020110130389 A | 12/2011 |
| WO | 03107540 A2 | 12/2003 |
| WO | 2007011295 A1 | 1/2007 |
| WO | 2010075190 A2 | 7/2010 |
| WO | 2012057674 A1 | 5/2012 |

OTHER PUBLICATIONS

3GPP, "3rd Generation Partnership Project; Technical Specification Group Radio Access Network; Evolved Universal Terrestrial Radio Access (E-UTRA); Base Station (BS) radio transmission and reception", 3GPP TS 36.104 V11.2.0, Sep. 2012, 1-198.

* cited by examiner

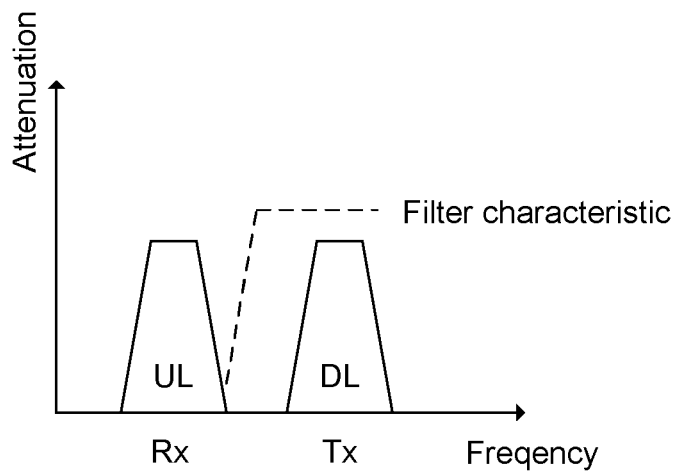
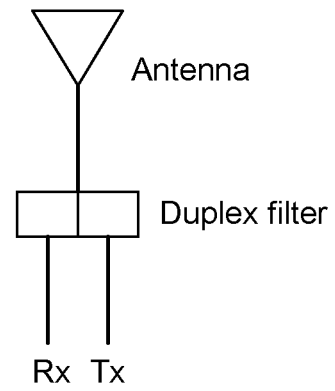
Fig. 1
Fig. 2
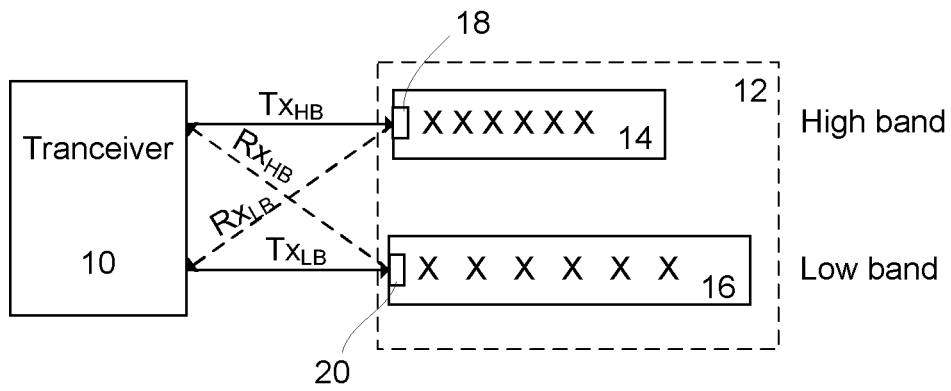
Fig. 3
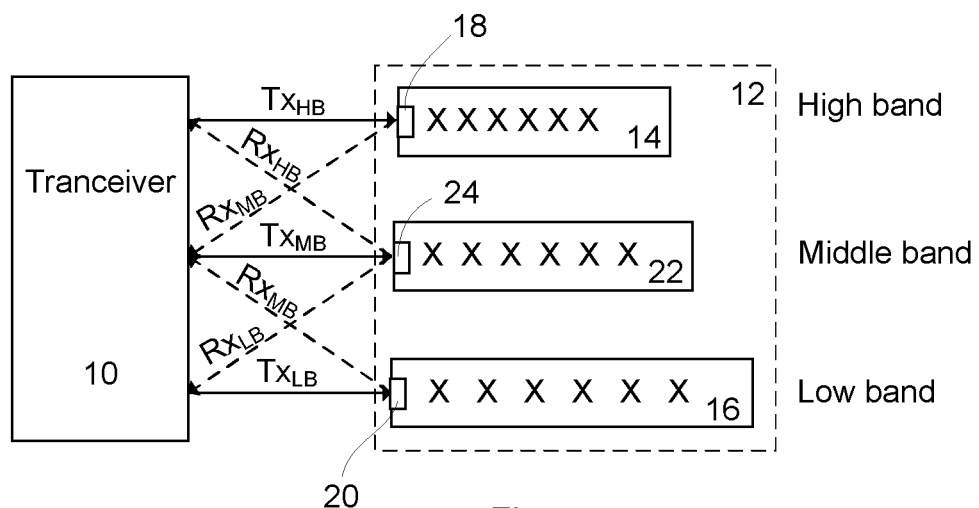
Fig. 4

ANTENNA ARRANGEMENT FOR MULTIPLE FREQUENCY BAND OPERATION

TECHNICAL FIELD

Embodiments of the present disclosure generally relate to radio base station antennas and a radio base station. More particularly, embodiments herein relate to antenna arrangements used for multiple frequency band operation in Frequency-Division Duplexing, FDD, systems.

BACKGROUND

Antenna arrangements of today are used for transmitting and receiving Radio Frequency (RF) signals in mobile communication systems. Usually the antenna arrangements are dedicated towards a single frequency band or sometimes towards two or more frequency bands. Antenna arrangements with a single frequency band have been in operation for a long time and typically include a number of antenna elements arranged in a vertical row. If an operator wants to add another frequency band then a second antenna arrangement may be added beside the first one. However, using single frequency band antennas to cover more than a single frequency band requires a lot of space during implementation, since each antenna arrangement will have its own antenna elements tuned into its specific frequency. There is also a potential problem that the two different frequency bands cause interference between the RF signals from the different antenna arrangements.

One way to solve this problem in prior art is to use two different types of antenna elements arranged alternated or interleaved in a column. One type of antenna elements may be configured to operate at one frequency band and the other type of antenna elements may be configured to operate at another frequency band. In such a solution the frequency bands may couple to each other due a close distance between the parts that make up the antenna. However, this is not a major problem when the frequency bands have a big separation. A big separation on the other hand makes the antenna more bulky. Instead of providing a big separation it is also possible to use filters with high Q values. Such filters generally require space and may be both expensive and heavy.

Another problem when designing wideband antennas is the requirement of an antenna spacing of 0.5λ in order to avoid grating lobes, where λ is the wavelength of the transmitter, Tx, signal. If a wideband transmitter and antenna elements are used, it is not possible to comply with this rule in a simple way. If, for example, one would like to cover frequencies from 1 to 2 GHz this would mean that the wavelength of the carrier span is between 15 and 30 cm. Traditionally the antenna arrays are designed such that the centre frequency is used to determine the element spacing. This will have the effect that the end frequencies for wideband antennas suffer from deteriorated performance.

U.S. Pat. No. 6,211,841 discloses an antenna arrangement solving the above problems with a different approach. This antenna arrangement includes first antenna elements positioned in two parallel columns, which operate in a lower frequency band. Furthermore, there are second antenna elements which alternately are positioned in two adjacent columns and operate in a higher frequency band. One of the two columns of the second antenna elements is provided in the same column as one of the columns of the first antenna elements and the other column is positioned between the two parallel columns of the first antenna elements. By positioning columns spaced apart and in parallel it is possible to accomplish low coupling between frequency bands being relatively close to each other, since the antenna elements are interleaved. Each antenna element is configured to receive and transmit at a certain frequency band. This US patent focuses on the configuration of the antenna elements in a common aperture such that the dimensions are kept at a minimum.

WO2007/011295 discloses an antenna arrangement for transmitting and receiving RF signals in at least two frequency bands. Sets of antenna elements are provided in an interleaved arrangement and positioned along a straight line so as to form a single column. A high band antenna is interleaved with low band apertures, where the antenna elements in each aperture are tuned to respective frequency, i.e. each element is dedicated to a specific frequency band.

In prior art there are also antennas which are used for multiple frequency band operation in FDD system for receiving and transmitting signals at the same time. The advantage with FDD systems is that one utilizes the bandwidth in a better way since it may be used for receiving and transmitting at the same time. Normally the same antenna is used for receiving and transmitting, and hence a duplex filter is generally needed to avoid interference from the transmitted signal at the receiver side. For example, Band 17 as specified in the $3^{rd}$ Generation Partnership Project (3 GPP) TS 36.104, Rel. 11.2.0, Table 5.5-1, uses 704-716 MHz as an Uplink (UL) band and 734-746 MHz as a Downlink (DL) band. Thus, for this particular band a duplex gap of 30 MHz is used. Since the received signal could be 100 dB smaller than the transmitted signal the received signal will be blocked out by emissions from the transmitter if not a duplex filter is used. The duplex filter should protect the receiver band from the out of band emissions from the transmitter. In general, this requires a filter with sharp edges and high attenuation in the stop band which require large and bulky cavity filters if there is a high output from the transmitter. A typical filter size for radio base station antennas using FDD and suitable for frequencies below 1 GHz, may for example be 35 cm×30 cm×17 cm and weigh about 5.5 kg. If many filters are required, e.g. in the case of a multi-band or wideband antenna system, the physical size of the total antenna arrangement will become large or very large. In case of multi-band antennas it is also possible to use a separate aperture for each supported frequency band in order to minimize interference between the frequency bands. Such a solution would of cause contribute to even larger and bulkier antenna solutions.

SUMMARY

In view of the above, an improved way to utilize a wideband antenna arrangement is desirable. The inventors of the present invention have realized that when designing a wideband antenna having more than one antenna element, each having a different antenna element spacing in order to avoid grating lobes as mentioned above, it is possible to use an antenna element configured for beamforming in the lower part of the frequency band of the wideband antenna to receive signals in the higher frequency band of the wideband antenna. The other way around it is possible to use an antenna element configured for beamforming in the higher part of the frequency band of the wideband antenna to receive signals in the lower frequency band of the wideband antenna.

Thus, it is therefore a general object of embodiments of the present disclosure to reduce the size of antenna arrangements used for multiple frequency band operation in FDD systems.

According to an aspect of the present invention this is accomplished by an antenna arrangement that is connectable to a transceiver for simultaneously transmitting RF signals. The antenna arrangement comprises at least two sets of antenna elements, wherein a first set of antenna elements has a first antenna element spacing and a second set of antenna elements has a second antenna element spacing. An interface unit of the first set of antenna elements is connected to the transceiver for transmitting RF signals with a first frequency and for receiving RF signals with a second frequency and an interface unit of the second set of antenna elements is connected to the transceiver for transmitting RF signals with the second frequency and for receiving RF signals with the first frequency.

According to embodiments of the present invention the antenna arrangement may also comprise a third set of antenna elements. The third set of antenna elements has a third antenna element spacing and an interface unit of the third set of antenna elements is connected to the transceiver for transmitting RF signals with a third frequency and for receiving RF signals with the first or second frequency.

According to other embodiments of the antenna arrangement each set of antenna elements may be provided in a separate aperture.

According to another aspect of the present invention there is accomplished a radio base station comprising a transceiver connected to an antenna arrangement according to embodiments of the present invention.

BRIEF DESCRIPTION OF THE DRAWINGS

These and other aspects, features and advantages of embodiments of the present disclosure will be apparent and elucidated from the following description of various embodiments, reference being made to the accompanying drawings, in which:

FIG. 1 is a schematic diagram illustrating an exemplary band gap between uplink and downlink carriers and the filter characteristic for protecting the receive signal;

FIG. 2 is a schematic diagram illustrating an exemplary FDD antenna provided with a duplex;

FIG. 3 is a schematic diagram illustrating an exemplary embodiment of the antenna arrangement having two frequency bands;

FIG. 4 is a schematic diagram illustrating an exemplary embodiment of the antenna arrangement having three frequency bands;

DETAILED DESCRIPTION

Figure 5:
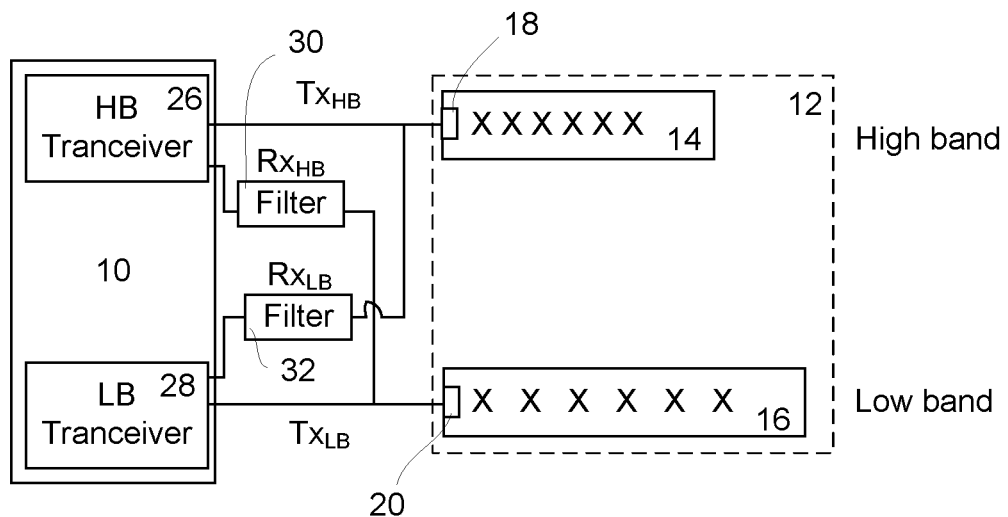
FIG. 5 is a block diagram showing an exemplary connection between the an antenna arrangement and transceivers for different frequency bands.

The invention will now be described more fully hereinafter with reference to the accompanying drawings, in which certain exemplary embodiments of the invention are shown. The invention may, however, be embodied in many different forms and should not be construed as limited to the embodiments set forth herein; rather, these embodiments are provided by way of example so that this disclosure will be thorough and complete, and will fully convey the scope of the present disclosure to those persons skilled in the art. Like numbers refer to like elements throughout the description.

Before different embodiments of the present invention will be described any closer a typical antenna arrangement used in a FDD system will be described in conjunction with FIGS. 1 and 2.

FIG. 1 shows a typically gap between UL and DL carriers in a FDD system. In the FDD system the base station receives and transmits at the same time. Normally the same antenna is used for receiving and transmitting, and hence a duplex filter is needed to protect the receiver from the transmitted signal. As is depicted in FIG. 1 such duplex filters needs to have a very sharp slope and good attenuation in the stop band since the Tx signal is much stronger than the Rx signal. The Rx signal could be 100 dB smaller than the Tx signal and would therefore be blocked out by emissions from the transmitter if not a duplex filter is used. As mentioned above filters having such characteristics require large and bulky cavity filters and may have a typical filter size having a volume of about 15-30 $dm^3$ and weigh about 5-7 kg. FIG. 2 schematically shows how a duplex filter is used to separate the Tx and Rx carriers.

Turning now to FIG. 3 an embodiment of the present invention will be described. The antenna arrangement 12 in FIG. 3 comprises a first set of antenna elements 14 and a second set of antenna elements 16. Each set of antenna elements 14, 16 comprises an interface unit 18, 20 respectively. The interface units 18, 20 are each connected to a transceiver 10. As is schematically shown the antenna element spacing for the second set of antenna elements 16 is greater than for the first set of antenna elements. Thus, the first set of antenna elements 14 is configured to be more suitable for transmitting high band frequencies and the second set of antenna elements is configured to be more suitable for transmitting low band frequencies. Thus by using two separate sets of antenna elements 14, 16 it is possible to use the antenna arrangement 12 as a wideband antenna without the drawback of creating grating lobes as mentioned above. The interface unit 18 of the first set of antenna elements 14 is connected to the transceiver 10 for transmitting RF signals, $Tx_{HB}$, with a first frequency in a high band range and for receiving RF signals, $Rx_{LB}$, with a second frequency in a low band range. The interface unit 20 of the second set of antenna elements 16 is connected to the transceiver 10 for transmitting RF signals, $Tx_{LB}$, with the second frequency in the low band range and for receiving RF signals, $Rx_{HB}$, with the first frequency in the high band range.

It may seem odd to receive low band RF signals, $Rx_{LB}$, with the high band antenna elements 14 and receive high band RF signals, $Tx_{HB}$, with the low band antenna elements 16. Normally the same set of antenna elements and aperture used for both transmitting and receiving in a specified frequency band such as a low or high frequency band. However, the inventors realized that antenna element spacing is less important for receiving RF signals. The main reason for this is that the signals transmitted from for example an user equipment, UE, usually comprise pilot or reference signals. This makes it possible for the transceiver 10 to estimate the channel between the UE and the antenna arrangement 12. These channel estimates are in general used for coherent detection of the received signal. This also means that the exact phase relation between the receiver antennas can be considered known, i.e. within channel estimation error bounds. This information is then used to form the receiver weights, which then constitutes the UL beamformer weights. From this it is clear that an antenna aperture designed for transmitting at one frequency also may be used as a receiver antenna aperture for another frequency and still has reasonable performance. Thus, the use of bulky filters is not longer necessary when using the antenna arrangement 12 according to FIG. 3.

In an exemplary embodiment the of antenna arrangement 12 in FIG. 3 the first set of antenna elements 14 and the second set of antenna elements 16 may cover a bandwidth from 1800 MHz to 2600 MHz. In such a case the first antenna element spacing may be configured for a frequency of 1800 MHz and the second antenna element spacing may be configured for a frequency of 2600 MHz.

Turning now to FIG. 4 another embodiment of the present invention will be described. Compared to FIG. 3 a third set of antenna elements 22 has been added to cover also a middle band, said third set of antenna elements having an antenna element spacing somewhere in between the first and second antenna elements 14, 16. Since the first and second antenna elements 14, 16 have been described in conjunction with FIG. 3 they will not be described again. The third antenna element 22 comprises an interface unit 24 which is connected to the transceiver 10 for transmitting RF signals, $T_{MB}$, with a third frequency and for receiving RF signals, $Rx_{MB}$, with the first or second frequency. The same principle as described in conjunction FIG. 3, i.e. to receive a signal on the "wrong" band, is also applicable to the antenna arrangement of FIG. 4.

In the antenna arrangement 12 described in conjunction with FIG. 4 the third set of antenna elements 22 may cover a bandwidth from 1800 MHz to 2600 MHz and may have an antenna element spacing that is configured for a frequency of 2100 MHz.

Even if it is not shown in any figures it is also possible to extend the concept described in FIGS. 3 and 4 to have a fourth set of antenna elements, which covers a bandwidth from 900 MHz to 2600 MHz and wherein the fourth antenna element spacing is configured for a frequency of 900 MHz.

The above embodiments have been described with an antenna element spacing that is configured for two or more of the following frequencies 900 MHz, 1800 MHz, 2100 MHz and 2600 MHz. However, it should be understood that there may be other frequencies relating to other standards that might be applicable as well within the scope of the present invention. Such other frequencies may be but are not limited to 700 MHz, MHz, 850 MHz and 1500 MHz. The exact combinations of different frequencies may be decided by an operator.

For various embodiments of the present invention each set of the antenna elements (14, 16, 22) may be provided in a separate aperture.

The above examples of sets of antenna elements have all been depicted and described as "one dimensional" arrays (one column or one row) for the sake of simplicity. However, it should be understood that the sets of antenna elements may be realized as two dimensional arrays. Normally, there would be one column where the antenna elements are connected by a passive feeder network to form one antenna port to the base stations. Typical element spacing in vertical domain would then be around 1λ (wavelength). Several columns or polarization states within one column are then used to provide several antenna ports to the base station.

Figure 6:
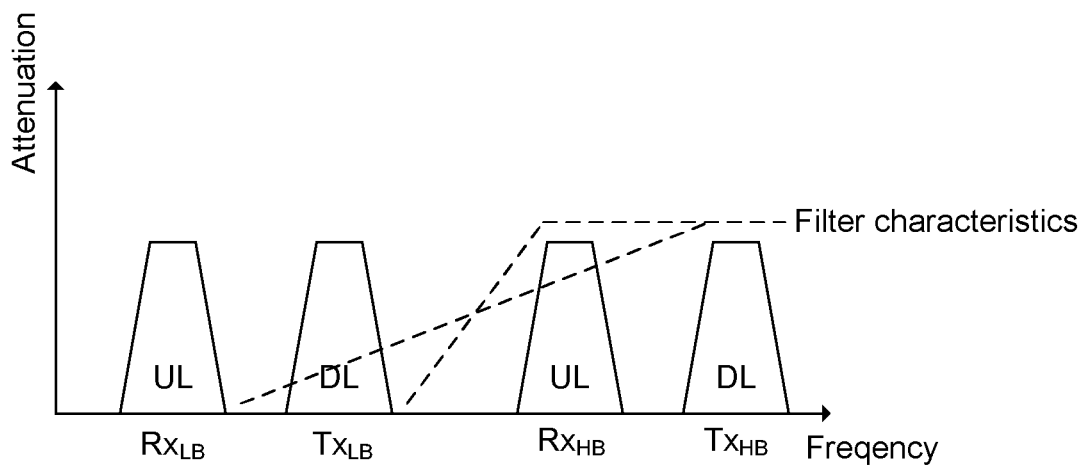
FIG. 6 is a schematic diagram illustrating an exemplary band gap between uplink and downlink carriers according to an exemplary embodiment and the filter characteristic for protecting the receive signals.

With reference to FIG. 5, there is shown an example where small filter 30, 32 are used to further improve the performance of the antenna arrangement 12. In this case the filters 30, 32 are provided for the receiving RF signals, $Rx_{HB}$, $Rx_{LB}$ and are connected to a high band side 26 and a low band side 28 respectively of the transceiver 10. Such filters 30, 32 may be a surface acoustic wave filter, a bulk acoustic wave filter or a ceramic filter. Such filters 30, 32 are considerably smaller then the bulky duplex filters described above. The reason why it is possible to use these smaller filters is because the requirements of filter characteristics are not as harsh as the example described above in conjunction with FIG. 1 above. This is evident by looking at the filter characteristics for the small filter 30, 32 depicted in FIG. 6. This means that the filters 30, 32 have low Q-values.

Figure 7:
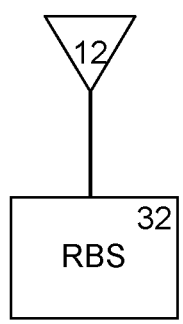
FIG. 7 is a schematic diagram illustrating a radio base station connected to the antenna arrangement.

FIG. 7 is a schematic diagram illustrating a radio base station, RBS, 32 connected to the antenna arrangement 12 as described above.

With embodiments of the antenna arrangement described above it is possible to provide good beamforming properties. This is due to the use of different sets of antenna elements having different antenna element spacing that fulfill the antenna spacing requirements of around 0.5λ or less. With the disclosed embodiments it is further possible to build a small and compact antenna system without any heavy duplex filters.

Although the present disclosure has been described above with reference to specific exemplary embodiments, it is not intended to be limited to the specific form set forth herein. In the pending claims, the term "comprise/comprises" does not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Reference signs in the claims are provided merely as a clarifying example and should not be construed as limiting the scope of the claims in any way.

The invention claimed is:

1. A transceiver arrangement for simultaneously transmitting and receiving radio frequency (RF) signals, said transceiver arrangement comprising:
    at least first and second sets of antenna elements, each set having a plurality of antenna elements, wherein the first set of antenna elements has a first element-to element spacing and is configured for transmit beamforming in a first part of a frequency band, and wherein the second set of antenna elements has a second element-to-element spacing, differing from the first element-to-element spacing, and is configured for transmit beamforming in a second part of the frequency band, the second part of the frequency band being separated from and higher in frequency than the first part of the frequency band; and
    first and second transceiver circuits, the first transceiver circuit being configured to receive signals in the first part of the frequency band, via a first transceiver input, and to transmit signals in the first part of the frequency band, via a first transceiver output, and the second transceiver circuit being configured to receive signals in the second part of the frequency band, via a second transceiver input, and to transmit signals in the second part of the frequency band, via a second transceiver output;
    wherein the first set of antenna elements is coupled to the first transceiver output so as to transmit signals from the first transceiver circuit, in the first part of the frequency band, and is coupled to the second transceiver input so as to pass received signals to the second transceiver circuit, in the second part of the frequency band;
wherein the second set of antenna elements is coupled to the second transceiver output so as to transmit signals from the second transceiver circuit, in the second part of the frequency band, and is coupled to the first transceiver input so as to pass received signals to the first transceiver circuit, in the first part of the frequency band.

2. The transceiver arrangement of claim 1, further comprising first and second filters tuned to the first and second parts of the frequency band, respectively, wherein the first set of antenna elements is coupled to the second transceiver input via the second filter and wherein the second set of antenna elements is coupled to the first transceiver input via the first filter.

3. The transceiver arrangement of claim 1, wherein the first set of antenna elements and the second set of antenna elements cover the bandwidth from 1800 MHz to 2600 MHz and the first element-to element spacing is configured for transmit beamforming at a frequency of 1800 MHz and the second element-to element spacing is configured for transmit beamforming at a frequency of 2600 MHz.

4. The transceiver arrangement of claim 1, further comprising:
a third set of antenna elements, having a plurality of antenna elements with a third element-to element spacing, differing from the first and second element-to-element spacings, and configured for transmit beamforming in a third part of the frequency band, the third part of the frequency band being separate from the first and second parts of the frequency band;
a third transceiver circuit, the third transceiver circuit being configured to receive signals in a third part of the frequency band, via a third transceiver input, and to transmit signals in the third part of the frequency band, via a third transceiver output; and
wherein the third set of antenna elements is coupled to the third transceiver output so as to transmit signals from the first transceiver circuit, in the third part of the frequency band, and is coupled to either the first transceiver input or the second transceiver input so as to pass received signals to the first transceiver circuit or second transceiver circuit, in the first or second part of the frequency band.

5. The transceiver arrangement of claim 4, wherein the third set of antenna elements covers a bandwidth from 1800 MHz to 2600 MHz and the third element-to element spacing is configured for transmit beamforming at a frequency of 2100 MHz.

6. The transceiver arrangement of claim 5, further comprising a fourth set of antenna elements, with a fourth element-to-element spacing, which covers a bandwidth from 900 MHz to 2600 MHz, wherein the fourth element-to element spacing is configured for a frequency of 900 MHz.

7. The radio base station of claim 1, wherein the transceiver arrangement further comprises first and second filters tuned to the first and second parts of the frequency band, respectively, wherein the first set of antenna elements is coupled to the second transceiver input via the second filter and wherein the second set of antenna elements is coupled to the first transceiver input via the first filter.

8. A radio base station comprising the transceiver arrangement of claim 1.

9. The radio base station of claim 8, wherein each set of antenna elements is provided in a separate aperture.

10. The radio base station of claim 8, wherein the first set of antenna elements and the second set of antenna elements cover the bandwidth from 1800 MHz to 2600 MHz and the first element-to element spacing is configured for transmit beamforming at a frequency of 1800 MHz and the second element-to element spacing is configured for transmit beamforming at a frequency of 2600 MHz.

11. The radio base station of claim 10, wherein the third set of antenna elements covers a bandwidth from 1800 MHz to 2600 MHz and the third element-to element spacing is configured for transmit beamforming at a frequency of 2100 MHz.

12. The radio base station of claim 8, wherein the transceiver arrangement further comprises:
a third set of antenna elements, having a plurality of antenna elements with a third element-to element spacing, differing from the first and second element-to-element spacings, and configured for transmit beamforming in a third part of the frequency band, the third part of the frequency band being separate from the first and second parts of the frequency band;
a third transceiver circuit, the third transceiver circuit being configured to receive signals in a third part of the frequency band, via a third transceiver input, and to transmit signals in the third part of the frequency band, via a third transceiver output; and
wherein the third set of antenna elements is coupled to the third transceiver output so as to transmit signals from the first transceiver circuit, in the third part of the frequency band, and is coupled to either the first transceiver input or the second transceiver input so as to pass received signals to the first transceiver circuit or second transceiver circuit, in the first or second part of the frequency band.

* * * * *